United States Patent [19]

Ohtomo et al.

[11] Patent Number: 4,773,749

[45] Date of Patent: Sep. 27, 1988

[54] OPHTHALMOLOGIC PHOTOGRAPHING APPARATUS

[75] Inventors: Fumio Ohtomo; Susumu Takahashi, both of Tokyo, Japan

[73] Assignee: Tokyo Kogaku Kikai Kabushiki Kaisha, Tokyo, Japan

[21] Appl. No.: 140,907

[22] Filed: Dec. 30, 1987

Related U.S. Application Data

[63] Continuation of Ser. No. 767,732, Aug. 20, 1985.

[30] Foreign Application Priority Data

Aug. 21, 1984 [JP] Japan .................................. 59-172480
Sep. 14, 1984 [JP] Japan .................................. 59-194120

[51] Int. Cl.$^4$ ........................ A61B 3/14; G03B 29/00; G03B 7/00
[52] U.S. Cl. .................................... 351/206; 354/410; 354/62
[58] Field of Search ........................ 351/205, 206, 214; 354/410, 62, 63

[56] References Cited

U.S. PATENT DOCUMENTS 3,944,342 3/1976 Martinez .............................. 351/206
4,429,970 2/1984 Fujiwara .............................. 351/206

FOREIGN PATENT DOCUMENTS 55-78218 6/1980 Japan .
56-72841 6/1981 Japan .
58-136328 8/1983 Japan .

Primary Examiner—Rodney B. Bovernick
Assistant Examiner—P. M. Dzierzynski
Attorney, Agent, or Firm—Finnegan, Henderson, Farabow, Garrett & Dunner

[57] ABSTRACT

An ophthalmologic photographing apparatus is disclosed. It comprises an observation light source for illuminating an eye to be tested; an observation optical system for forming an observation image of the eye to be tested and a corresponding image optically conjugate to the former; a photograph light source; a photograph device for photographing the eye to be tested; a light measuring device formed of a number of light receiving elements for dividing the corresponding image into a number of picture elements in order to measure the light volume per each picture element. The light receiving elements being disposed at a position where the corresponding image is formed. An indicator formed of a number of indicating elements corresponding to the light receiving elements and disposed at a position where the observation image is formed or otherwise at a position conjugate thereto. The apparatus further includes a proper exposure value set-up device comprising an exposure value set-up circuit, light volume comparator and an indicator actuating circuit for actuating the indicating elements, and a photograph light source control device for controlling the light volume emitted from the photograph light source based on the set-up exposure value information.

20 Claims, 4 Drawing Sheets

OPHTHALMOLOGIC PHOTOGRAPHING APPARATUS

This application is a continuation of application Ser. No. 767,732, filed Aug. 20, 1985.

BACKGROUND OF THE INVENTION

1. Field of the Invention

This invention relates to an ophthalmologic instrument such as, for example, a photo slit lamp including an illumination optical system for illuminating an eye to be tested, an observation optical system for observing the eye to be tested, and photograph means for photographing the eye to be tested, and more particularly to an improvement on an ophthalmologic instrument including a proper exposure control means for the photograph means, and an indication mechanism for indicating a proper exposure position of photograph to an inspector or ophthalmologist.

2. Related Art of the Invention

There are generally known a fundus camera, photo slit lamp, photographing apparatus for examination microscope, etc., as an ophthalmologic apparatus for observing and photographing an eye to be tested. Especially, regarding a photo slit lamp, exposure conditions at the time when a photo is taken are decided according to personal impressions or experiences of an inspector or ophthalmologist, since the object for observation and photograph spreads in various tissues of an anterior eye portion such as, cornea, iris, crystalline lens, etc.

Japanese Patent Early Disclosure (Kokai Koho) No. 56(1981)-72841 (hereinafter referred to as "A") discloses a comparable device wherein the exposure conditions are automatically decided. There are also Japanese Patent Early Disclosure Nos. 55(1980)-78218 (hereinafter referred to as "B") and 58(1983)-136328 (hereinafter referred to as "C") which disclose a light volume measurement of a portion to be photographed as a prerequisite for deciding the exposure condition as well as indication means for indicating the measuring position to the inspector or ophthalmologist.

According to the disclosure of A, photographing conditions such as film speed, predetermined coefficient according to a photograph object portion of an eye to be tested, photograph magnitude, illumination conditions, etc. are preliminarily programmed in advance for computing proper exposure conditions, and based on the computed results, light volume to be emitted from a flashing tube as a photograph light source is properly adjusted. According to the disclosure of B, the image of an eye to be tested is divided into a plurality of picture elements, and light receiving elements corresponding to each of the picture elements and selection means thereof are provided, and at the same time, in order to show an inspector or ophthalmologist which picture element is being measured in its light volume information, a plurality of light emitting elements individually corresponding to the light receiving elements are indicated on the observation image in superposed relation, and a proper exposure volume is decided based on light volume information of the picture element under measurement. Similarly, according to the disclosure of C, the apparatus includes a pair of light emitting-light receiving elements which are movable in a plane optically conjugate to an observation image of an eye to be tested, an index light is projected to a photograph portion of the eye to be tested, the index image is shown to the inspector or ophthalmologist in its state superposed on the observation image, by moving the pair of light emitting-receiving elements, the inspector or ophthalmologist is allowed to select a portion to be measured, the light volume of a portion where the index light is projected is measured, and based on the measured results, the portion where the index light is projected is determined to be an object portion for photographing.

The apparatus disclosed in A has the disadvantage that it is hardly put into practical use, since the range of photograph conditions for obtaining a satisfactory picture is very limited due to the arrangement that the exposure conditions are decided by a predetermined program. On the other hand, the apparatus disclosed in B has such an advantage that it includes means for measuring light volume information per every picture element. However, it also has the disadvantage that the plurality of light emitting elements and light receiving elements per every picture element are required to provide individual correlation, and photograph condition information input means such as film speed, illumination condition (width of slit, length of slit, illumination lamp output), etc. and picture element selection means are required to operate separately. The disadvantage which the apparatus disclosed in C has is in difficulty of its operation. That is, since an index light is projected to the portion to be photographed and the portion where the index light is projected is measured, when the eye to be tested is moved, the object portion to be photographed is inevitably moved. Accordingly, the index light is required to follow from time to time the movement of the object portion to be photographed, i.e., the portion to be measured and change the projecting position of the index light.

SUMMARY OF THE INVENTION

It is therefore a general object of the present invention to provide a photographing apparatus of an ophthalmologic instrument, wherein an object portion to be photographed is measured in light volume by simple operation, a proper exposure condition is selected based on such measured information, and at the same time, the object portion which can be photographed under such proper exposure condition is indicated to an inspector or ophthalmologist.

In accordance with the invention there is provided an ophthalmologic photographing apparatus which includes an observation light source for selectively illuminating an eye to be tested during observation of the eye by an operator, an observation optical system for forming an observation image of the eye to be tested and for forming a corresponding image at a position optically conjugate to the observation image, a photograph light source for selectively illuminating the eye to be tested when photographing the eye and photograph means for photographing the eye to be tested. The apparatus further includes light volume measuring means disposed at the position of the corresponding image and including a plurality of light receiving elements for dividing the corresponding image into a plurality of picture elements corresponding to the light receiving elements in order to measure the light volume per each picture element when the observation light source is activated to illuminate the eye. Further provided are indication means including a plurality of indicating elements corresponding to the light receiving elements disposed at the position where the observation image is formed, and proper exposure value set-up means which comprises an exposure value set-up circuit for selectively choosing a set-up exposure value, a light volume comparator for comparing the set-up exposure value and the light volume information measured by the light volume measuring means, and an indication means actuating circuit for actuating said indication elements of the indication means. The light volume comparator is operative to determine when the set-up exposure value information and the light volume information are substantially equal with respect to each other. Also provided is a photograph light source control means for controlling the light volume emitted from said photograph light source based on said set-up exposure value information.

According to the present invention, when the exposure volume set-up means is operated, an inspecter or ophthalmologist can be shown or indicated a picture element among other picture elements of an observation image of a portion to be photographed of an eye to be tested, which corresponds to a portion properly photographed by the set-up exposure volume based on a measured light volume information per every picture element and a set-up exposure volume information.

DETAILED DESCRIPTION OF THE EMBODIMENTS

A preferred embodiment of a photographing apparatus of an ophthalmologic instrument according to the present invention will be described hereunder with reference to the accompanying drawings, wherein the present invention is embodied as a photo slit lamp.

Figure 1:
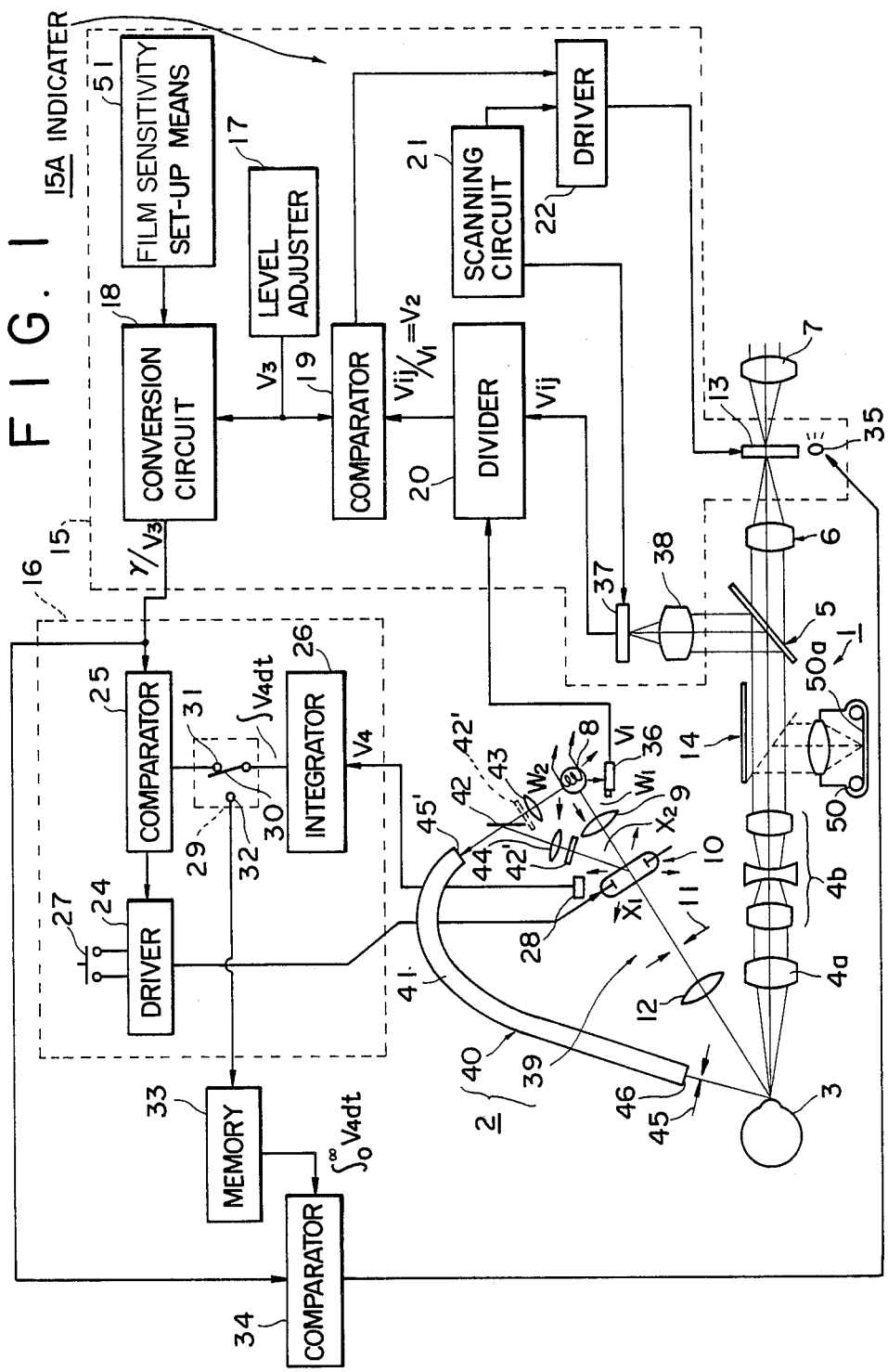
FIG. 1 is a schematic view of a photographing apparatus of an ophthalmologic instrument according to a first embodiment of the present invention.

In FIG. 1, reference numeral 1 denotes an observation optical system, 2 denotes an illumination optical system, and 3 denotes an eye to be tested. The observation optical system 1 generally comprises an objective lens 4a, a variable power zoom system 4b, a half mirror 5, an image formation lens 6, and an ocular 7.

The illumination optical system 2 is such constituted as to render a slit illumination light and a background illumination light to the eye 3 to be tested at a time when the eye 3 to be tested is observed and photographed. In FIG. 1, reference numeral 39 denotes a slit illumination optical system and reference numeral 40 denotes a background illumination optical system. The slit illumination optical system 39 illuminates the eye 3 to be tested in such a manner as to optically cut the eye 3 to be tested in order to obtain a sectional image thereof. On the other hand, the background illumination optical system 40 uniformly illuminates the eye 3 to be tested so that an incident position of the slit light can be confirmed.

The slit illumination optical system 39 generally comprises an observation light source 8, a focusing lens 9, a flash tube 10 as a photograph light source, a slit 11, and a projection lens 12. On the other hand, the background illumination optical system 40 generally comprises an optical fiber 41, a half mirror 42, focusing lenses 43 and 44, and a diaphragm 45. The focusing lens 43 is disposed between the half mirror 42 and the observation light source 8. The focusing lens 44 is disposed between the flash tube 10 and the half mirror 42. Disposed between the half mirror 42 and the flash tube 10 or between the half mirror 42 and the observation light source 8 is an ND filter 42'. When in observation, a part of light emitted from the observation light source 8 is transmitted through the half mirror 42 and guided to a light receiving end 45', and radiated from a radiating end 46 of the optical fiber 41 to the eye 3 to be tested as a background illumination light in order to illuminate the eye 3 to be tested. When in photographing, a part of light emitted from the flash light 10 is reduced by the ND filter 42', reflected by the half mirror 42 and guided to the light receiving end 45', and radiated to the eye 3 to be tested from the radiating end 46 of the optical fiber 41 in order to illuminate the eye 3 to be tested. In this embodiment, the ND filter 42' functions as a light volume ratio set-up means, and, if provided within the optical path, has such a function as to set up a suitable light volume ratio so that a light volume ratio W2/W1 between a light volume W1 of the slit illumination light when in observation and a light volume W2 of the background illumination light when in observation, and a light volume ratio X2/X1 between a light volume X1 of the slit light when in photographing and a light volume X2 of the background illumination light when in photographing will become equal.

The observation optical system 1 is provided with a liquid crystal plate 13 as an opto-electric indication means between the image formation lens 6 and the ocular 7. In this embodiment, the liquid crystal plate 13 is formed thereon with an observation image. Disposed between the variable power zoom system 4b and the half mirror 5 is a quick return mirror 14. This quick return mirror 14 is inserted in the optical path of the observation optical system 1 when in photographing for guiding the photograph light bundle to a camera 50. In this embodiment, a film surface 50a of the camera 50 is optically conjugatingly disposed with respect to the liquid crystal plate 13.

The photographing apparatus includes a proper exposure volume set-up circuit 15 and a flash tube control circuit 16. The proper exposure volume set-up circuit 15 generally comprises a level adjuster 17 as an exposure volume set-up means, a conversion circuit 18, and an indication means or indicator 15A. The indication means or indicator 15A generally comprises a comparator 19, a divider 20, a scanning circuit 21, and a driver 22. Functions of the respective circuits will be described hereinafter.

Figure 2:
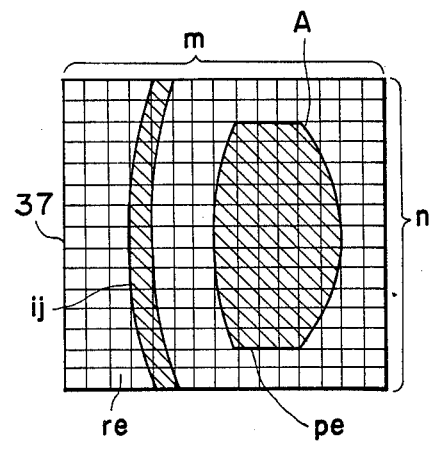
FIG. 2 is a plan view showing the arrangement of the image pick-up elements and their relation with a corresponding image thereto.

The level adjuster 17 is adapted to output an exposure volume set-up value. The level adjuster 17 comprises, for example, a volume, etc. The exposure volume set-up value V3 is inputted in the conversion circuit 18 and the comparator 19. The comparator 19 is already inputted with the output from the divider 20 together with the set-up value of the level adjuster 17. The divider 20 is already inputted with an output V1 of the light receiving element 36 and an output Vij of the image pick-up element 37. The image pick-up element 37 comprises, a solid image pick-up element such as, for example, an area-type CCD, etc., and constitutes a part of a light volume measuring means together with the image formation lens 38. The image pick up element 37 is formed thereon with a corresponding image A (see FIG. 2) optically conjugate with the observation image of the eye to be tested as shown in FIG. 2. Since the image pick up element 37 comprises m times n pieces of minute light receiving elements "RE", it has such function as to divide the corresponding image A of the eye 3 to be tested into m times n pieces of picture elements "PE" and to measure the light volume per every picture element. The scanning circuit 21 designates the address ij (i=1, 2, 3 ... m, j=1, 2, 3 ... n) of the light receiving element RE, and the designated element, $\gamma e$, outputs a photometric value Vij or measured value of the light volume to the divider 20. The divider 20 has such a function as to compensate a photometric value Vij based on the output V1 of the light receiving element 36, thus enabling to effect a correct compensation according to change of brightness of the observation light source 8 due to adjustment of the illumination light source. The driver 22 is inputted with the output of the scanning circuit 21 as well as the output of the comparator 19. The liquid crystal plate 13 comprising m times n pieces of segment ST, as in the case of the minute light receiving elements RE, constituting the image pick up element 37, is synchronized with a scanning signal from the scanning circuit 21, so that segment of an address $\overline{\overline{ij}}$ ($\overline{i}$=1, 2, 3 ... m, $\overline{j}$=1, 2, 3 ... n) individually corresponding to the address of the light receiving element RE is consecutively designated.

Figure 3:
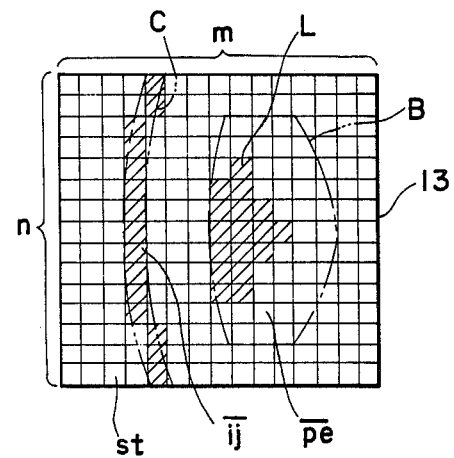
FIG. 3 is a plan view showing the arrangement of a liquid crystal plate and its relation with an observation image.

When the comparator 19 outputs the result of its comparison that the photometric value Vij/V1=V2, corresponding to the light receiving element RE at the address ij of the image pick up element 37 and the exposure volume input value V3 inputted by the level adjuster 17, is substantially equal (for example, $\alpha$V3<V2<V3: $\alpha$ being a predetermined coefficient between zero and one, the segment ST at the address $\overline{\overline{ij}}$ of the liquid crystal plate 13 blinks as shown in FIG. 3 (the segments which blink is provided with slant lines in FIG. 3 for easy reference). The foregoing indicates to the inspector or ophthalmologist that the picture image $\overline{\overline{pe}}$ of the observation image B (which is in accord with the corresponding image A), formed on the liquid crystal plate 13 of the eye 3 to be tested corresponding to the blinking segments, become a proper photograph object portion which is readily photographed.

When the level adjuster 17 is operated to change the exposure volume set-up value V3, the segments ST of the liquid crystal plate 13, corresponding to the light receiving elements RE of the image pick up element 37, output a photometric value in accordance with the new set-up value and are caused to blink. In this way, the photograph object portion which can be properly photographed at the set-up exposure value is changed according to the exposure volume set-up value set up by the level adjuster 17.

With the foregoing configuration, the inspector or ophthalmologist can obtain a desired exposure volume set-up value by operating the level adjuster 17 in such a manner that the segments corresponding to the desired picture element group, for example, the picture element group consisting of the corneal sectional image C and the sectional image L of the front portion of the crystalline lens in FIG. 3, are caused to blink, while concurrently observing the observation image B formed on the liquid crystal plate 13 through the ocular 7. The conversion circuit 18 is inputted with a desired exposure volume set-up value V3 thus obtained. After converting the value v3 to a proper exposure value $\gamma$/V3, the conversion circuit 18 outputs it to the flash tube control circuit 16. In this embodiment, $\gamma$ denotes a gain constant of the conversion circuit 18 which is changed according to ISO speed set up by the film sensitivity set up means 51.

The flash tube control circuit 16 generally comprises a flash tube driver 24, a comparator 25 and an integrator 26. The flash tube driver 24 functions to operate the flash tube 10 when a switch 27 is turned on, and, to stop the flashing of the flash tube 10 according to the output of the comparator 25. The comparator 25 is inputted with the proper exposure value r/V3 of the conversion circuit 18 and an integrated value from the integrator 26. The integrator 26 is adapted to integrate an output V4 of a light receiving element 28 which receives flash light of the flash tube 10. When an integrated value $\int V4 dt$ from the integrator 26 is judged to reach a proper exposure value r/V3 from the conversion circuit 18, the comparator 25 stops the driver 24 and stops the flashing of the flash tube 10. A change-over switch 29 is provided between the comparator 25 and the integrator 26. When a contact 30 contacts a terminal 31, the output of the integrator 26 is inputted into the comparator 25.

When the contact 30 contacts a terminal 32 (that is, at the time when a photograph is taken with no load in order to detect the whole flashing volume of the flash tube 10 in advance), the output of the integrator 26 is inputted in a memory 33. The integrator 26 outputs an integrated value $$\int_0^\infty V4dt$$

from the time when the flash tube 10 started flashing till the time when it stops flashing toward the memory 33. Thereafter, the contact 30 is returned to the terminal 31 side. When a proper exposure value set-up motion is made and the proper exposure value r/V3 is outputted from the conversion circuit 18, the output of the memory 33 is already inputted in the comparator 34, a comparator 34 compares the integrated value $$\int_0^\infty V4dt$$

outputted from the memory 33 and the proper exposure value r/V3 outputted from the conversion circuit 18. When the comparator 34 judges that even if the flash tube 10 is flashed during the whole flashing time, the exposure will be insufficient, the comparator 34 issues a warning to the inspector or ophthalmologist of the shortage of exposure by causing illumination element to blink.

Also, in this embodiment, as already described in the foregoing, the ratio W2/W1 between an illumination light volume W1 of the observation light source 8 to the slit illumination optical system 39 side, and an illumination light volume W2 of the background illumination optical system, is set up in such a manner as to be equal to a ratio X2/X1 of illumination volume to the respective illumination optical systems of the flashing optical light source 10. Due to the foregoing, when in observation (the time when a proper exposure value is set up), there is obtained a photometric value or measured light volume value of the eye 3 to be tested illuminated by an illumination light volume based on the sum of a light volume W1 of the slit illumination light, and a light volume W2 of the background illumination light by an image pick up element 37. A proper exposure value is set up based on the photometric value, and light emission of the flash tube 10 is controlled at the time when a picture is taken. Since the respective light volume ratios X2/X1 and W2/W1 of the background illumination and the slit illumination are set up to be substantially equal, the photograph object portion can be photographed in the same contrast as the one which was confirmed when the observation image was observed.

Figure 6:
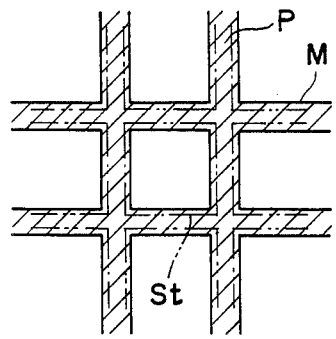
FIG. 6 is a schematic illustration showing a relation between segments of the liquid crystal plate and a mask thereof.
Figure 4:
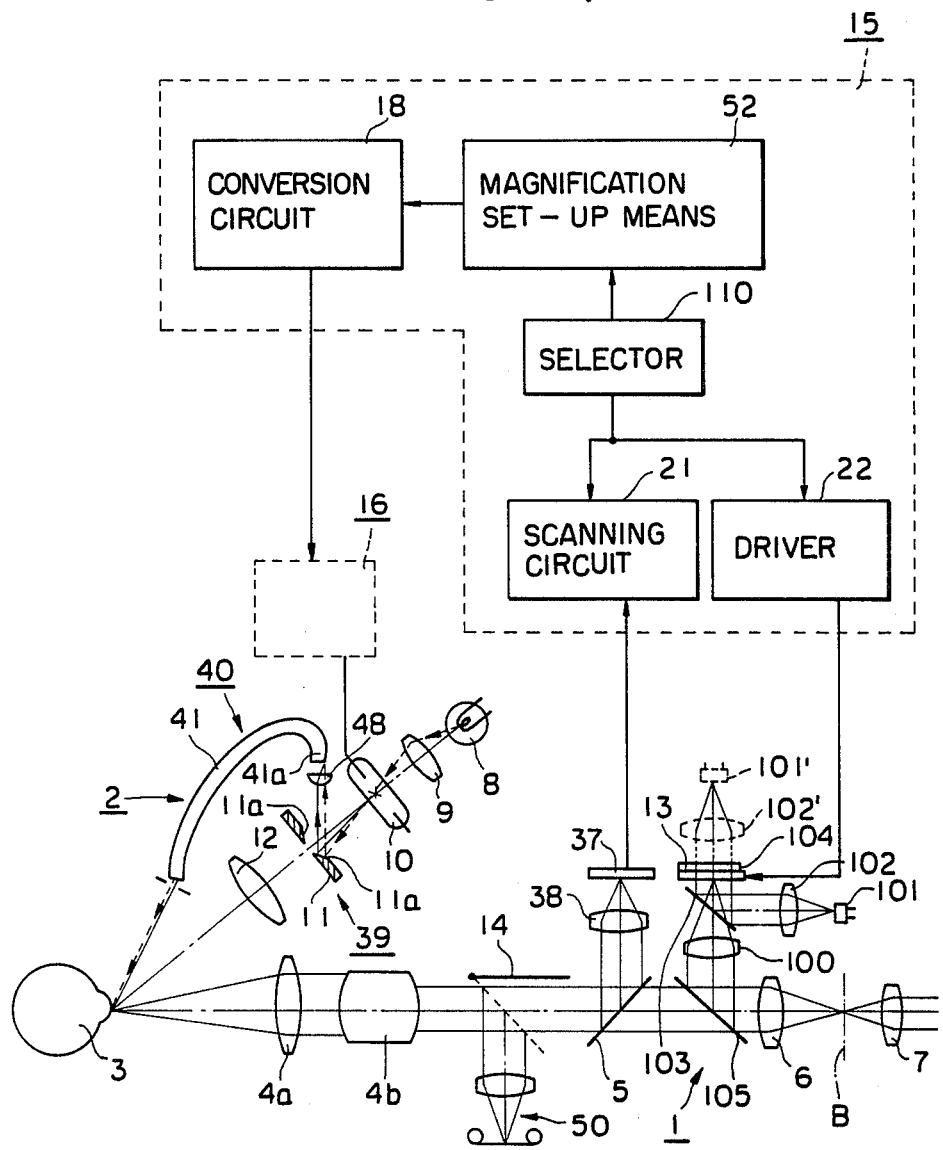
FIG. 4 is a schematic view showing a second embodiment of the present invention.

FIGS. 4 through 6 illustrate constitutional views of a photo slit lamp according to a second embodiment of the present invention, wherein same or identical component parts as those of the first embodiment described are denoted by same reference numerals and description thereof is omitted.

In the second embodiment shown in FIG. 4, the liquid crystal plate 13 is disposed outside of the observation optical system 1, and the image thereof is formed at an image formation position of the observation image B in superposed relation by a lens 100, half mirrors 105 and a lens 6. When a reflection-type of liquid crystal plate 13 is used, a reflector 104 is disposed behind the liquid crystal plate 13, so that light emitted from a light emitting diode 101 is radiated for illumination, as shown by solid lines in FIG. 4, by a lens 102, and a half mirror 103. When a transmission-type of liquid crystal plate 13 is used, the reflector 104 is removed and transmitted illumination is made from the opposite side, as shown by broken lines in FIG. 4, by a light emitting diode 101' and a lens 102'.

Figure 5A:
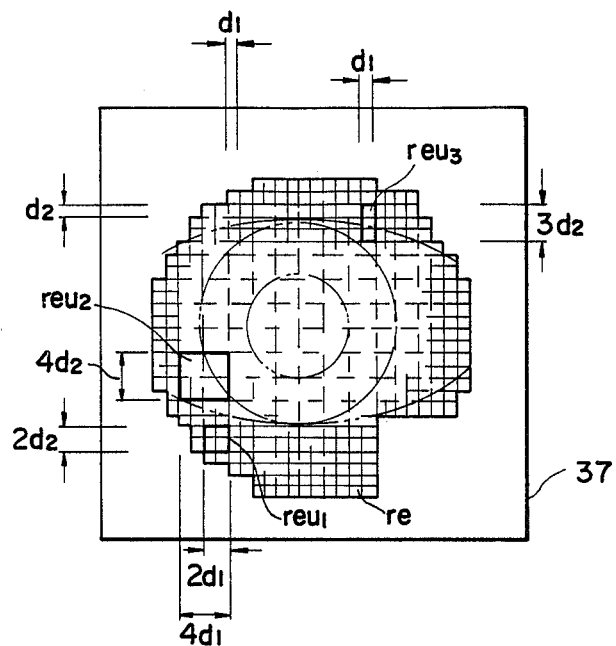
FIGS. 5(A) and (B) are schematic illustrations showing a corresponding relation between a liquid crystal plate and the image pick-up element, respectively, used in the second embodiment.
Figure 5B:
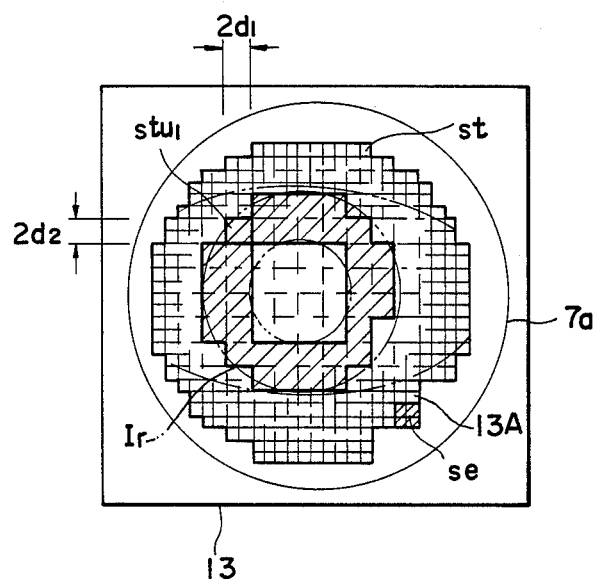

In this second embodiment, in order to make the light receiving unit dimension of the image pick up element 37 as light volume measuring means variable, a predetermined number of light receiving elements RE can be combined in order to form different shapes of light receiving units REU1, REU2, REU3, etc., as shown in FIG. 5A and FIG. 5B. When the size of the light receiving element RE is set to be $d1 \times d2$, for exmple, REU1 becomes a light receiving unit of $2d1 \times 2d2$, that is, it has a 4 times larger dimension with respect to RE. Likewise, REU2 becomes $4d1 \times 4d2$, that is, it has a 16 times larger dimension with respect to RE, and REU3 becomes $d1 \times 3d2$, that is, it has 3 times larger dimension with respect to re.

These light receiving units are selected by a selector circuit 110. The selector circuit 110 is connected to the scanning circuit 21, the liquid crystal plate driver 22, and the magnification set-up means 52. The magnification set-up means 52 is connected to the conversion circuit 18. With the foregoing configuration, based on a selected light receiving unit, the light receiving element of CCD and the segment of the liquid crystal plate are changed in their scanning pitches. That is, their scanning pitches are changed to be a scanning pitch per every light receiving unit. Likewise, regarding the blinking unit of segments of the liquid crystal plate 13, the segments are properly grouped so that the blinking unit thereof will become the same dimension of that of the selected light receiving unit. For example, the segment unit STU1 in FIG. 5 corresponds to the light receiving unit REU1 having 4 times larger dimension of that of the segment ST. Furthermore, there is provided at the right and lower portion an indication area 13A which shows the size of the light receiving unit (this can be taken as a size of a segment unit when viewed from the indication side) selected by the selector circuit 110. And segments within the area 13A are blinked to indicate as a sample segment, unit SE corresponding to the light receiving unit selected. In FIG. 5B, a circle 7a shows a view field of the ocular 7. Similarly, the two dotted chain lines schematically show an observation image, when viewed from the front of the anterior portion of the eye to be tested, in which the segment unit group shown by slant lines indicates that a proper exposure value of an iris Ir portion is decided and segments of that portion are blinking. Regarding the magnification set-up means 52, a coefficient value to be multiplied by a photometric value or measured light volume value of the light receiving element RE is selected in accordance with the change of the light receiving unit. In the example of FIG. 5B, since the newly set up light receiving unit REU1 corresponds to 4 pieces of the light receiving elements RE, the photometric values from the individual light receiving unit RE are multiplied by $\frac{1}{4}$. Since light scanning is effected per every light receiving unit REU1, light volume is measured per every sum ($\frac{1}{4} \times 4 = 1$) of 4 pieces of the light receiving elements re. Due to the foregoing, the same photometric result is obtained as in the case wherein scanning is effected per every least light receiving element re.

In this second embodiment, it is preferable to use a non-conductive character indicate type liquid crystal plate for the liquid crystal plate 13. Furthermore, as shown in FIG. 6, in order to prevent the degrading of the observation image B due to leakage of the illumination light from a gap P between the segments st, the liquid crystal plate 13 is preferably provided with a mask frame M for blocking the gap P.

The incident end portion 41a of the optical fiber of the background illumination element 41 is located in such a position where the incident end portion 41a can take in the reflected light from knife edges 11a, the edges 11a forming a part of the slit 11 through a condenser lens 48. With the foregoing arrangement, the light bundle from the observation light source 8 as well as the light bundle from the flashing tube 10 are reflected by the knife edges and entered into the fiber 41. Accordingly, there is not required such optical volume ratio set-up means as the ND filter for equalizing the feed light volume ratio W2/W1 of the observation light source to the slit illumination optical system and the background illumination optical system, and the feed light volume ratio X2/X1 of the flash tube to both the optical systems as required in the first embodiment.

Although preferred embodiments have been described in the foregoing, the present invention is not limited to the above embodiments. Instead, the present invention includes the following.

(1) The image pick up element 37 and the liquid crystal plate 13 may be different in number of composing elements with each other. Generally, the number of light receiving elements of the image pick up element 37 is approximately $500 \times 400$ pieces which are great when compared with the number of segments of the liquid crystal plate 13. Accordingly, the imge pick up element 37 may be divided into light receiving element groups comprising a plurality of light receiving elements, and for example, a $10 \times 10$ pieces of light receiving element group may be regarded as a new element. In this case, the new element may be made in correspondence with one element or segment of the liquid crystal plate 13. (2) Instead of using the liquid crystal plate 13, a light emitting element array may be used.

(3) In order to prevent a patient to be tested from being exposed to flashing light of the flash tube 10 at the time when a photograph is taken with no film loaded as described, a shutter may be provided, so that this shutter is shut at the time when a photograph is taken with no film loaded. In the background illumination optical system 40, the diaphragm 45 may be arranged such that the diaphragm 45 is shut at the time when a photograph is taken with no film loaded. Also, such no film loaded photograph may be automatically taken as soon as the change-over switch 29 is turned on at its contact 32 side.

(4) Such display as "proper exposure", "first step exposure over", and "first step exposure under" may be shown by using the output of the conversion circuit 18.

(5) In an ophthalmologic instrument wherein an observation image is observed by a TV monitor by using a video TV camera, instead of using the liquid crystal plate 13 for indicating the proper exposure portion as in the embodiments, the proper exposure portion may be blinked on an image on the video TV monitor by using a video signal.

(6) In the first and second embodiments shown in FIGS. 1 and 4, the image pick up element 37 and the liquid crystal plate 13 are disposed in an observation optical system, respectively. The photo slit lamp usually has a binocular observation optical system for the use of both eyes so that a stereoscopic observation can be made. Accordingly, for example, the right eye observation optical system may be provided with an image pick up element, and the right eye observation optical system may be provided with a liquid crystal plate, respectively.

(7) If the normal superposition of the image of the liquid crystal plate 13 on the observation image B should degrade the observation image, an on/off switch may be additionally employed in order to stop the actuation of the liquid crystal plate 13 when the light volume is not measured, or a shutter may be disposed between the half mirror 105 and the lens 100 in FIG. 4.

(8) The present invention is applicable even in such a case where only the slit illumination optical system 39 or only the background illumination optical system 40 is functioned in the illumination optical system 2.

What is claimed is:

1. An ophthalmologic photographing apparatus comprising:

An observation light source for selectively illuminating an eye to be tested during observation of the eye by an operator;

an observation optical system for forming an observation image of the eye to be tested and for forming a corresponding image at a position optically conjugate to said observation image;

a photograph light source for selectively illuminating the eye to be tested when photographing the eye;

photograph means for photographing said eye to be tested;

light volume measuring means disposed at said position of said corresponding image and including a plurality of light receiving elements for dividing said corresponding image into a plurality of picture elements corresponding to said light receiving elements in order to continuously measure the light volume per each picture element when said observation light source is activated to illuminate the eye;

indication means for indicating the light exposure volume at said picture elements including a plurality of indicating elements corresponding to said light receiving elements and disposed at the position where said observation image is formed;

proper exposure value set-up means comprising an exposure value set-up circuit for selectively choosing a set-up exposure value, light volume comparator for comparing said set-up exposure value and the light volume information measured by said light volume measuring means, and an indication means actuating circuit for actuating said indication elements of said indication means when said selected set-up exposure value is achieved at said receiving elements corresponding to a position of said observation image to be photographed, said light volume comparator operative to determine when said set-up exposure value information and said light volume information are substantially equal with respect to each other; and photograph light source control means for controlling the light volume emitted from said photograph light source based on said set-up exposure value information.

2. An ophthalmologic photographing apparatus according to claim 1, wherein said light volume measuring means is an area-type solid image pick-up element.

3. An ophthalmologic photographing apparatus according to claim 1, wherein said indication means is a liquid crystal indicator.

4. An ophthalmologic photographing apparatus according to claim 1, wherein said photograph light source is a flash tube.

5. An ophthalmologic photographing apparatus according to claim 1, wherein said proper exposure value set-up means includes film speed set-up means for providing film speed information to said photograph means, and conversion means for converting said set-up exposure value information into a proper exposure value in accordance with said inputted film speed information, said photograph light source control means operative to control the volume of the light to be emitted from said photograph light source in accordance with said proper exposure value.

6. An ophthalmologic photographing apparatus according to claim 1, wherein said proper exposure volume set-up means further includes a monitoring light receiving means for monitoring the emitted light volume from said observation light source and for measuring and storing the light volume as a monitored light volume value, and compensating means for compensating the emitted light volume in accordance with the monitored light volume value.

7. An ophthalmologic photographing apparatus according to claim 1, wherein said photograph light source control means comprises a light receiving means for detecting the light volume emitted from said photograph light source, an integrator for integrating the light volume detected by said light receiving means, an emitted light volume comparator for comparing the integrated light volume when a photograph is taken with said set-up exposure value, and a photograph light source actuating circuit for stopping emission of the light from said photograph light source when said emitted light volume comparator judges that said integrated light volume and said set-up exposure light volume are substantially equal.

8. An ophthalmologic photographing apparatus according to claim 7, which further includes a memory means for storing a value corresponding to the available full emitable light volume from said photograph light source, and comparing means for comparing said full emitable light volume value with said set-up exposure value and issuing a warning to the operator when said set-up exposure value is larger than said full emitable light volume value.

9. A photo slit lamp comprising:
a slit illumination optical system including an observation light source and a photograph light source for illuminating an eye to be tested, a slit opening for restricting the light from said observation and photograph light sources, and a projection lens for projecting a flux of light from said slit opening toward the eye to be tested;
an observation optical system for forming an observation image of the eye to be tested and a corresponding image optically conjugate thereto;
a photograph means mounted to said observation optical system and adapted to photograph the eye to be tested;
light volume measuring means disposed at the position where said corresponding image is formed and including a plurality of light receiving elements for dividing said corresponding image into a number of picture elements in order to continuously measure the light volume per each picture element when said observation light source is activated;
indication means formed of a plurality of indication elements corresponding to said light receiving elements and disposed at the position where said observation image is formed;
proper exposure value set-up means comprising an exposure value set-up circuit for selectively choosing a set-up exposure value, light volume comparator for comparing said set-up exposure value and said light volume of said picture element measured by said light volume measuring means, and an indication means actuating circuit for actuating said indication elements when said ligh volume comparator determines that said set-up exposure value and said light volume value of said picture element are substantially equal; and
photograph light source control means for controlling the light volume emitted from said photograph light source based on said set-up exposure value information.

10. A photo slit lamp according to claim 9, wherein said proper exposure value set-up means includes film speed set-up means for providing film speed information to said photograph means, and conversion means for converting said set-up exposure value information into a proper value in accordance with said inputted film speed information, said photograph light source control means operative to control the volume of the light to be emitted from said photograph light source in accordance with said proper exposure value.

11. A photo slit lamp according to claim 9, wherein said light volume measuring means is an area-type solid image pick-up element.

12. A photo slit lamp according to claim 9, wherein said indication means is a liquid crystal indicator.

13. A photo slit lamp according to claim 9, wherein said photograph light source is a flash tube.

14. A photo slit lamp according to claim 9, wherein said photograph light source control means comprises a light receiving means for detecting the light volume emitted from said photograph light source, an integrator for integrating the light volume detected by said light receiving means, an emitted light volume comparator for comparing the integrated light volume when a photograph is taken with said set-up exposure value, and a photograph light source actuating circuit for stopping emission of the light from said photograph light source when said emitted light volume comparator judges that said integrated light volume information and said set-up exposure light volume information are substantially equal.

15. A photo slit lamp according to claim 14, which further includes a memory means for storing a value corresponding to the full emitable light volume from said photograph light source, and comparing means for comparing said full emitable light volume value with said set-up exposure value and issuing a warning to an inspector or ophthalmologist when said set-up exposure value is larger than said full emitable light volume value.

16. A photo slit lamp according to claim 9, wherein said illumination means includes a background illumination optical system.

17. A phot slit lamp according to claim 16, wherein a ratio W2/W1 between a radiation light volume W1 of said slit illumination optical system, and a radiation light volume W2 of said background illumination optical system is equal to a ratio X2/X1 between a light volume X1 radiated from said photograph light source to said slit illumination optical system, and a light volume X2 radiated from said photograph light source to said background illumination optical system.

18. A photo slit lamp according to claim 16, wherein said background illumination-optical system comprises an otpical fiber having an incidence and portion for receiving light, said incidence end portion being disposed to face a knife edge portion of said slit opening so that at least a portion of the light emitted from both said observation light source and said photograph light source is reflected by said knife edge portion and impinges on said incidence end portion of said optical fiber.

19. A photo slit lamp according to claim 9, wherein said proper exposure volume set-up means further includes a monitoring light receiving means for monitoring the emitted light from said observation light source and for measuring and storing the light volume as a monitored light volume value, and compensating means for compensating the emitted light volume in accordance with the monitored light volume value.

20. A photo slit lamp according to claim 19, wherein said compensation means is a divider for dividing said measured light volume value by said monitored light volume value.

* * * * *

UNITED STATES PATENT AND TRADEMARK OFFICE
CERTIFICATE OF CORRECTION

PATENT NO. : 4,773,749

DATED : September 27, 1988

INVENTOR(S) : Fumio Ohtomo; Susumu Takahashi

It is certified that error appears in the above-identified patent and that said Letters Patent is hereby corrected as shown below:

Claim 9, col. 11, line 47, change "ligh" to --light--.

Signed and Sealed this

Twenty-sixth Day of December, 1989

Attest:

JEFFREY M. SAMUELS

Attesting Officer     Acting Commissioner of Patents and Trademarks